(12) United States Patent
Shon et al.

(10) Patent No.: US 8,213,403 B2
(45) Date of Patent: Jul. 3, 2012

(54) MOBILITY HEADER COMPRESSION METHOD AND SYSTEM FOR INTERNET PROTOCOL-BASED LOW POWER WIRELESS NETWORK

(75) Inventors: Tae Shik Shon, Suwon-si (KR); Sun Gi Kim, Seoul (KR); Hyo Hyun Choi, Seoul (KR); Jin Ho Kim, Goyang-si (KR); Choong Seon Hong, Yongin-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 648 days.

(21) Appl. No.: 12/354,821

(22) Filed: Jan. 16, 2009

(65) Prior Publication Data
US 2009/0185549 A1    Jul. 23, 2009

(30) Foreign Application Priority Data

Jan. 17, 2008   (KR) .................... 10-2008-0005310

(51) Int. Cl.
*H04J 3/24* (2006.01)
(52) U.S. Cl. ......................................... 370/349; 370/474

(58) Field of Classification Search .................. 370/349, 370/389, 392, 474
See application file for complete search history.

(56) References Cited

U.S. PATENT DOCUMENTS

| | | | |
|---|---|---|---|
| 2007/0047551 A1* | 3/2007 | Conner et al. | 370/394 |
| 2007/0195764 A1* | 8/2007 | Liu et al. | 370/389 |
| 2007/0248075 A1* | 10/2007 | Liu et al. | 370/349 |
| 2007/0258458 A1* | 11/2007 | Kapoor | 370/394 |
| 2008/0056273 A1* | 3/2008 | Pelletier et al. | 370/395.21 |

* cited by examiner

*Primary Examiner* — Brian D Nguyen
(74) *Attorney, Agent, or Firm* — Cha & Reiter, LLC (57) ABSTRACT

A mobility header compression method and system for an IPv6-based LoWPAN is provided for supporting IPv6 mobility to the IPv6-based LoWPAN checks a packet carrying data and a first and a second headers containing transmission information about the data to determine whether the second header contains a compressed Internet Protocol version 6 (IPv6) information. When the second header contains a compressed IPv6 information, ands followed by a mobility header, a mobility support-indicative field of the first header is set to indicate that the second header is followed by the mobility header and the rest of the fields of the second header are compressed except for the mobility header-indicative field. A mobility information-indicative field of the mobility header is set to indicate inclusion of mobility information; and the rest of the fields of the mobility header are compressed except for the mobility information-indicative field.

23 Claims, 10 Drawing Sheets

LOWPAN_HC1 DISPATCH (410)

HC1 COMPRESSED IPv6 HEADER (420)

FIG. 5

LOWPAN_HC1 DISPATCH (510)

HC1 WITH MH (520)

MOBILITY HEADER COMPRESSION METHOD AND SYSTEM FOR INTERNET PROTOCOL-BASED LOW POWER WIRELESS NETWORK

CLAIM OF PRIORITY

This application claims priority to an application entitled "MOBILITY HEADER COMPRESSION METHOD AND SYSTEM FOR INTERNET PROTOCOL-BASED LOW POWER WIRELESS NETWORK" filed in the Korean Intellectual Property Office on Jan. 17, 2008 and assigned Serial No. 2008-0005310, the contents of which are incorporated herein by reference in its entirety.

BACKGROUND OF THE INVENTION

1. Field of the Invention

The present invention relates to an Internet Protocol version 6 (IPv6) based Lower Power Wireless Personal Area Network (LoWPAN). More particularly, the present invention relates to supporting mobility for LoWPAN and a system for IPv6-based LoWPAN.

2. Description of the Related Art

A low power wireless network, particularly, a low power Wireless Personal Area Network (LoWPAN), is a simple low cost communication network that allows for wireless connectivity in application with limited power and relaxed throughput requirements. Wireless sensor network such as ZigBee, which is a non-IP network, is an exemplary LoWPAN, and there have been continuing research and standardization efforts in the IPv6 over LoWPAN (6LoWPAN) for providing IP network connectivity to non-IP based LoWPAN by means of a gateway. However, there are many problems which remain unsolved that hinder the implementation of the 6LoW-PAN. One of the significant problems is a mismatch in transmit unit size between IPv6 and IEEE standards.

For example, IPv6 packet has a Maximum Transmission Unit (MTU) of 1280 bytes, whereas Institute of Electrical and Electronics Engineers (IEEE) 802.15.4 standard packet is only allowed to carry an 81-byte Protocol Data Unit (PDU) for upper layers. Thus, the IEEE 802.15.4 packet is very short in comparison with the IPv6 MTU. That is, the Media Access Control (MAC) layer packet can vary up to 127 bytes. In consideration of a MAC header in which maximum length is 25 bytes, the MAC layer packet spares only 102 bytes for upper layer payload. Furthermore, an optional but highly recommended security feature at the link layer poses an additional overhead, leaving only 81 bytes.

In order to solve the aforementioned packet size mismatch problem, an adaptation mechanism has been proposed for fragmenting and reassembling IP packets between the IP layer and LoWPAN MAC layer. The adaptation layer is responsible for fragmentation, reassembly, IPv6 header compression/decompression, User Datagram Protocol/Transmission Control Protocol/Internet Control Message Protocol version 6 (UDP/TCP/ICMPv6) header compression, mesh routing, and IPv6 address autoconfiguration.

Meanwhile, there are increasing needs for providing Internet access services to mobile nodes, as well as for fixed nodes or networks. However, the conventional 6LoWPAN packet is limited to support mobility to the mobile nodes and networks, due to the lack of its inefficient design and packet length limit in the mobility header.

Accordingly, there has been a long-felt need in the art to develop a method for compressing the LoWPAN packet for supporting mobility to the LoWPAN while improving transmission efficiency of the IPv6 packets.

SUMMARY OF THE INVENTION

The present invention provides a mobility header compression method and system for IPv6-based wireless network.

Also, the present invention provides a mobility header compression method and system for supporting mobility to Lower Power Wireless Personal Area Networks (LoWPAN) and also improving transmission efficiency of IPv6 packet in the LoWPAN environment.

In accordance with an exemplary embodiment of the present invention, a header compression method for a wireless network can include checking a packet carrying a data and a first and a second headers containing transmission information on the data to determine whether the second header contains a compressed Internet Protocol version 6 (IPv6) information; determining, when the second header contains a compressed IPv6 information, whether or not the second header is followed by a mobility header; setting, when the second header is followed by a mobility header, a mobility support-indicative field of the first header to indicate that the second header is followed by the mobility header; setting a mobility header-indicative field of the second header to indicate that the second header is followed by the mobility header; compressing rest fields of the second header except for the mobility header-indicative field; setting a mobility information-indicative field of the mobility header to indicate inclusion of mobility information; and compressing rest fields of the mobility header except for the mobility information-indicative field.

In accordance with another exemplary embodiment of the present invention, a header compression method for a wireless network can include receiving a binding update packet carrying a data and a first and a second headers containing transmission information on the data; determining whether the second header contains a compressed Internet Protocol version 6 (IPv6) information; setting, when the second header contains a compressed IPv6 information, a first header to have a mobility support-indicative field indicating that the first header is followed by a compressed IPv6 header with a mobility header; setting the second header to have a mobility header-indicative field for indicating that the second header is followed by the mobility header; compressing rest fields of the second header except for the mobility header-indicative field; setting the mobility header to have a mobility information-indicative field indicating the mobility header is followed by a binding acknowledgement information; and compressing rest fields of the mobility header except for the mobility information-indicative field.

In accordance with yet another exemplary embodiment of the present invention, a header compression system for a wireless network can include a plurality of mobile nodes, each node checks a packet carrying a data and a first and a second headers containing transmission information on the data to determine whether the second header contains a compressed Internet Protocol version 6 (IPv6) information; determines, when the second header contains a compressed IPv6 information, whether or not the second header is followed by a mobility header; sets, when the second header is followed by a mobility header, a mobility support-indicative field of the first header to indicate that the second header is followed by the mobility header; sets a mobility header-indicative field of the second header to indicate that the second header is followed by the mobility header; compresses rest fields of the second header except for the mobility header-indicative field;

sets a mobility information-indicative field of the mobility header to indicate inclusion of mobility information; and compresses rest fields of the mobility header except for the mobility information-indicative field.

BRIEF DESCRIPTION OF THE DRAWINGS

The above and other exemplary aspects, features and advantages of certain exemplary embodiments of the present invention will become more apparent from the following description taken in conjunction with the accompanying drawing, in which.

DETAILED DESCRIPTION

Exemplary embodiments of the present invention are described with reference to the accompanying drawings in detail. Although the invention is described in terms of exemplary embodiments, it should be understood that the invention is not limited to the embodiments shown and described Also, a person of ordinary skill in the art will appreciate that various modifications and variations can be made to the present invention without departing from the spirit of the invention and the scope of the invention. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

In the following description, a method for compressing a mobility header of a packet is proposed for supporting mobility to the LoWPAN as well as adopting IPv6 protocol to the LoWPAN using a limited packet size. The IPv6 header includes a basic header and extension headers. The length of the basic header is fixed to 40 bytes for this example. It should be understood that the present invention is applicable to other sizes of headers, and for example, the invention is applicable even if there is a modification to the standards discussed herein.

The basic header typically includes a 4-bit Version field, an 8-bit Traffic Class field, a 20-bit Flow Label field, a 16-bit Payload Length field, an 8-bit Next Header field, an 8-bit Hop Limit field, a 128-bit Source Address field, and a 128-bit Destination Address field.

All fields of the IPv6 header, except for the Hop Limit field (8 bits), can be compressed. For example, the Version field can be omitted if, for example, all packets are IPv6 packets. The 64-bit network prefix for both Source and Destination addresses can be compressed to a single bit each when they carry the well-know link-local prefix. The Length field can also be omitted because it can be inferred from the MAC header. The Traffic Class and Flow Label fields can be compressed to a single bit when their values are both zero. The Next Header field can be compressed to two bits when the packet uses UDP, TCP, or ICMP. Table 1 herein below shows a packet format including the compressed header formed in such a manner. During the compression process, most fields are reduced in bit number.

TABLE 1

| HC1 Encoding | Non-compressed fields follow |
| --- | --- |

As shown in table 1, the compressed IPv6 header is divided into a 1 byte Header Compression (HC1) Encoding field and Non-compressed field, i.e. the uncompressed 1-byte Hop Limit field. That is, the IPv6 header of 40 bytes is compressed to a minimum of a 2-byte compressed header.

The first two bits of the HC1 Encoding field carry the information on the compression of the IPv6 source address. Table 2 herein below shows the bit patterns of the first two bits and their meanings.

TABLE 2

| Bit pattern | Description |
| --- | --- |
| 00 | Both the IPv6 source address prefix and the Interface identifier (IID) are carried in-line without compression. |
| 01 | The prefix is carried in-line, and the IID is elided and derivable from the corresponding link layer address. |
| 10 | The prefix is compressed and assumed are link local prefix, and the IID is carried in-line |
| 11 | The prefix is compressed and assumed are link local prefix, and the IID is elided and derivable from the corresponding link layer address. |

Referring to Table 2, the third and fourth bits of the HC1 encoding field carry the information on the IPv6 destination address. The meanings of the bit patterns are shown in Table 2. The fifth bit of the HC1 encoding field carries information on the compression status of the traffic class and flow label. If the fifth bit is 1, then this indicates the information is compressed. Otherwise, if the fifth bit is 0, then this indicates the information is uncompressed. The sixth and seventh bits of the HC1 encoding field carry information on the compression status of the next header. '00' indicates that the next header is not compressed and carried in-line, '01' indicates UDP header, '10' indicates ICMP header, and '11' indicates TCP header. Finally, the eighth bit of the HC1 encoding field carries information on HC2 encoding field. '0' indicates the no more compressed bit, and '1' indicates that an HC2 encoding field corresponding to UDP, ICMP, or TCP follows the HC1 encoding field. The non-compressed fields following the HC1 encoding field are structured in the same order as in the IPv6 header before being compressed.

The 6LoWPAN header formats according to an exemplary embodiment of the present invention are described hereinafter. A 6LoWPAN header includes a Dispatch header carrying the above-described header information. All types of headers of an IPv6 packet follow the dispatch header. For example, when carrying a compressed IP or UDP header, the IPv6 packet includes an HC1 Dispatch header containing a compressed IP or UDP header information; when carrying a Mesh Routing header, the IPv6 packet includes a Mesh Dispatch header containing the mesh routing header information; and when carrying a Fragmentation header for fragmentation and reassembly, the IPv6 packet includes a Fragmentation Dispatch header containing Fragmentation header information. By redefining the dispatch headers, noble functions can be added to the header.

FIGS. 1A to 1D are diagrams illustrating dispatch header formats for use in a mobility header compression method and system according to an exemplary embodiment of the present invention.

As shown in the examples of FIGS. 1A to 1D, a dispatch header comprises 8 bits and the first two bits of the dispatch header are set distinguishably.

Figure 1A:
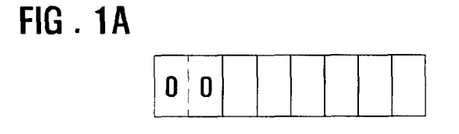
FIGS. 1A to 1D are diagrams illustrating dispatch header formats for use in a mobility header compression method and system according to an exemplary embodiment of the present invention.
Figure 1B:
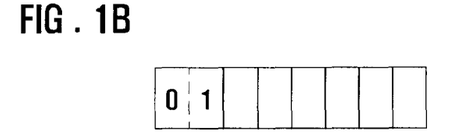
Figure 1C:
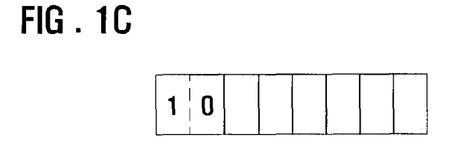
Figure 1D:
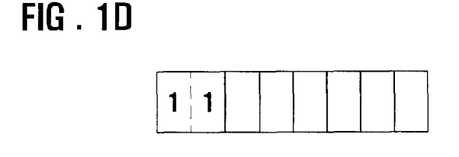

The first two bits both set to '0' as shown in FIG. 1A indicates that a non-LoWPAN header follows the dispatch header, and '01' as shown in FIG. 1B indicates that an IPv6 header follows the dispatch header. Also, the first two bits set to '10' as shown in FIG. 1C indicates that a mesh routing header follows the dispatch header, and '11' as shown in FIG. 1D indicates that a fragmentation header follows the dispatch header. The structure of HC1 Dispatch header, Mesh Dispatch header, and Fragmentation Dispatch header are described hereinafter in more detail with reference to FIGS. 2a to 2d.

FIGS. 2A to 2D are diagrams illustrating stacked 6LoWPAN packet header formats according to an exemplary embodiment of the present invention.

Figure 2A:
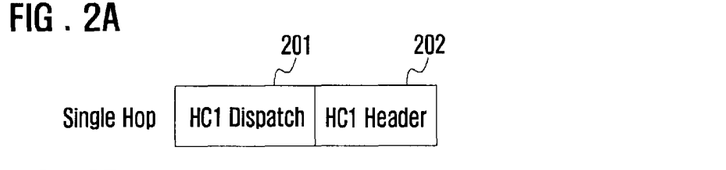
FIGS. 2A to 2D are diagrams illustrating stacked 6LoWPAN header formats according to an exemplary embodiment of the present invention.
Figure 2B:
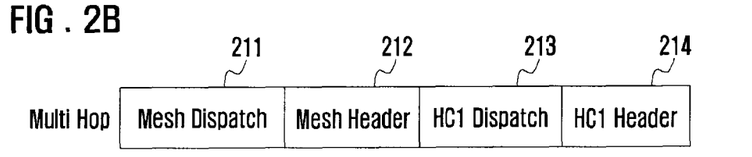
Figure 2C:
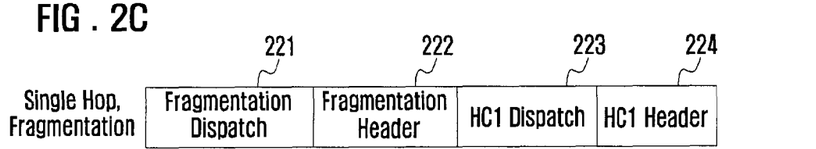
Figure 2D:
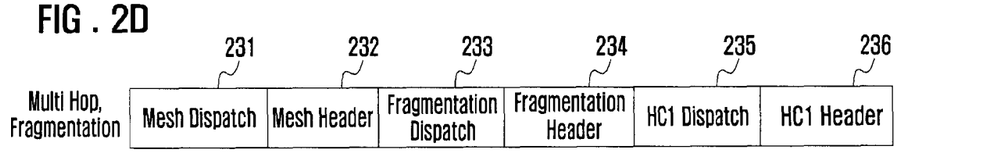

FIG. 2A shows a 6LoWPAN packet header format for use in a single hop network. In this case, the packet header includes a compressed IPv6 header (HC1) Dispatch header 201. The HC1 dispatch header 201 is followed by a compressed IPv6 (HC1 header) header 202. FIG. 2B shows a 6LoWPAN packet header format for use in a multi hop mesh network. In this case, the packet header includes a HC1 header and mesh rouging header. A Mesh dispatch header 211 is followed by a Mesh header 212, a HC1 dispatch header 213, and a HC1 header 214 in sequential order. FIG. 2C shows a 6LoWPAN packet header format for use in a single hop network using fragmentation mechanism. In this case, the packet header includes a HC1 header 224 and a fragmentation header 222. A fragmentation dispatch header 221 is followed by the fragmentation header 222, an HC1 dispatch header 223, and the HC1 header 224 in sequential order. FIG. 2d shows a 6LoWPAN packet header format for use in a multi hop network using fragmentation mechanism. In this case, the packet header includes an HC1 header 236, a Mesh Routing Header (Mesh header) 232, and a Fragmentation header 234. A Mesh Dispatch header 231 is followed by the Mesh header 232, a Fragmentation Dispatch header 233, the Fragmentation header 234, an HC1 dispatch header 235, and the HC1 header 236 in sequential order. That is, the headers are arranged in an order of the Mesh header, Fragmentation header, and HC1 header, and these headers follow respective dispatch headers. As aforementioned, the first two bits of each Dispatch header are used for indicating the type of header following itself, i.e. Mesh header, Fragmentation header, or HC1 header.

In order to simplify the explanation, the packet format carrying the mobility header for use in 6lowpans is described with the exemplary HC1 Dispatch header, i.e. the Dispatch header of which first two bits are set to '01'. Of course, the Mesh header and/or Fragmentation header is carried, the 6LoWPAN packet header can be constructed in the format of any of FIGS. 2b to 2d. In the case of header format of FIG. 2b, two types of IPv6 headers can follow the HC1 Dispatch header 213: one is compressed IPv6 header, and the other is an uncompressed IPv6 header.

Figure 3A:
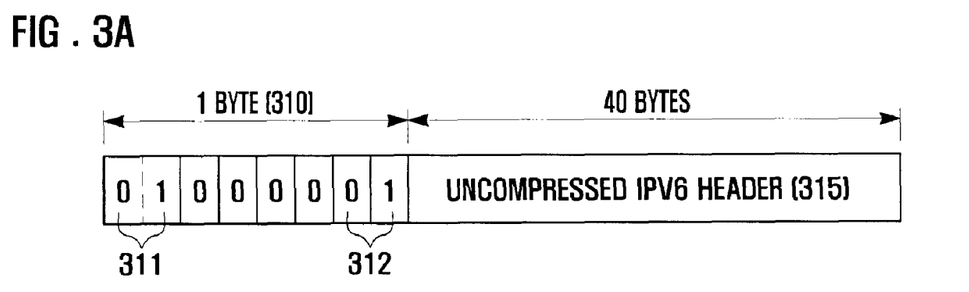
FIGS. 3A to 3C are diagrams illustrating bit patterns of dispatch headers for use in a 6LoWPAN according to an exemplary embodiment of the present invention.
Figure 3B:
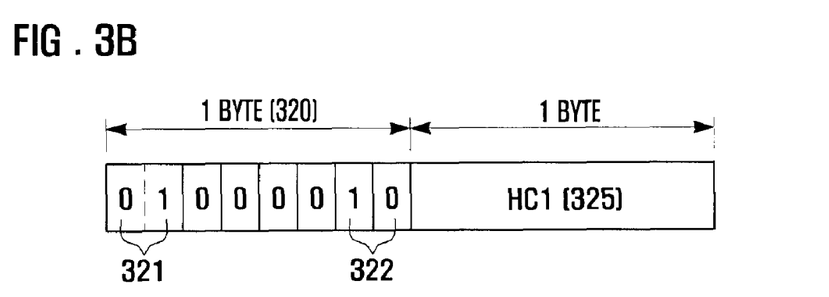
Figure 3C:
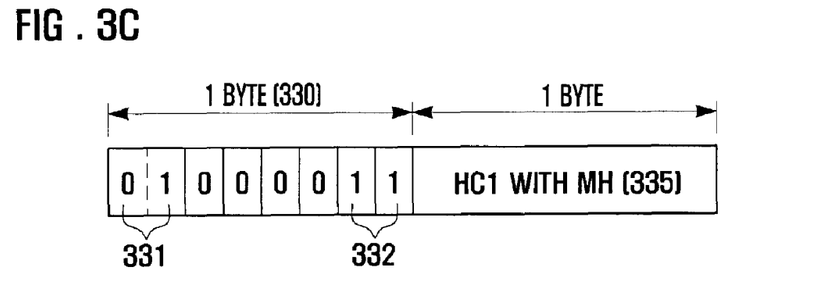

FIGS. 3A to 3C are diagrams illustrating bit patterns of dispatch headers for use in a 6LoWPAN according to an exemplary embodiment of the present invention.

In FIG. 3A, the first two bits 311 of a 1-byte Dispatch header 310 are set to '01' which indicates that the dispatch header 310 is followed by an IPv6 header 315, and the last two bits 312 of the Dispatch header 310 are set to '01' which indicates that the IPv6 header 315 is an uncompressed IPv6 header. In FIG. 3B, the first two bits 321 of the Dispatch header 320 are set to '01' which indicates that the Dispatch header 320 is followed by an IPv6 header 325, and the last two bits 322 of the Dispatch header 320 are set to '10' which indicates that the IPv6 header 325 is a compressed IPv6 header, i.e. HC1 header 325. In FIG. 3C, the first two bits 331 of the Dispatch header 330 are set to '01' which indicates that the dispatch header 330 is followed by an IPv6 header 335, and the last two bits 335 of the Dispatch header 330 are set to '11' which indicates that the IPv6 header 335 is compressed with a mobility header (HC1 with MH). Table 3 hereinbelow shows bit patterns of various Dispatch headers.

TABLE 3

| Bit pattern | Expression | Meanings |
| --- | --- | --- |
| 00 xxxxxx | NALP | Not a LoWPAN frame |
| 01 000001 | IPv6 | Uncompressed IPv6 Address |
| 01 000010 | LoWPAN_CH1 | LOWPAN_HC1 compressed IPv6 |
| 01 000011 | LOWPAN_MH | LOWPAN_MH compressed IPv6 Mobility header |
| . . . | Reserved | Reserved for future use |
| 01 010000 | LoWPAN_BC0 | LOWPAN_BC0 broadcast |
| . . . | Reserved | Reserved for future use |
| 01 111111 | ESC | Additional Dispatch byte follows |

The bit patterns 01 000001, 01 000010, and 01 000011 are the cases depicted in respective exemplary FIGS. 3A to 3C. That is, the Dispatch header having the bit pattern 01 000001 is followed by an uncompressed IPv6 Addresses, the Dispatch header having the bit pattern 01 000010 is followed by a compressed IPv6 header, i.e. LoWPAN_HC1 header, and the Dispatch header having the bit pattern 01 000011 is followed by a compressed LOWPAN mobility header, i.e. compressed LOWPAN_MH. Also, the Dispatch header having the bit pattern 00 xxxxxx is followed by a non-LoWPAN packet, the Dispatch header having the bit pattern 01 010000 is followed by broadcasting (BC) packets, and the Dispatch header having the bit pattern 01 111111 is followed by an additional dispatch byte. Other bit patterns (except for the aforementioned 00 xxxxxx, 000001, 01 000010, 01 000011, 01 010000, 01 111111) are reserved for the future use. The compressed IPv6 headers including a mobility header as an extension header are described in more detail with the examples of Dispatch headers having bit patterns 01 000010 and 01 000011.

Figure 4:
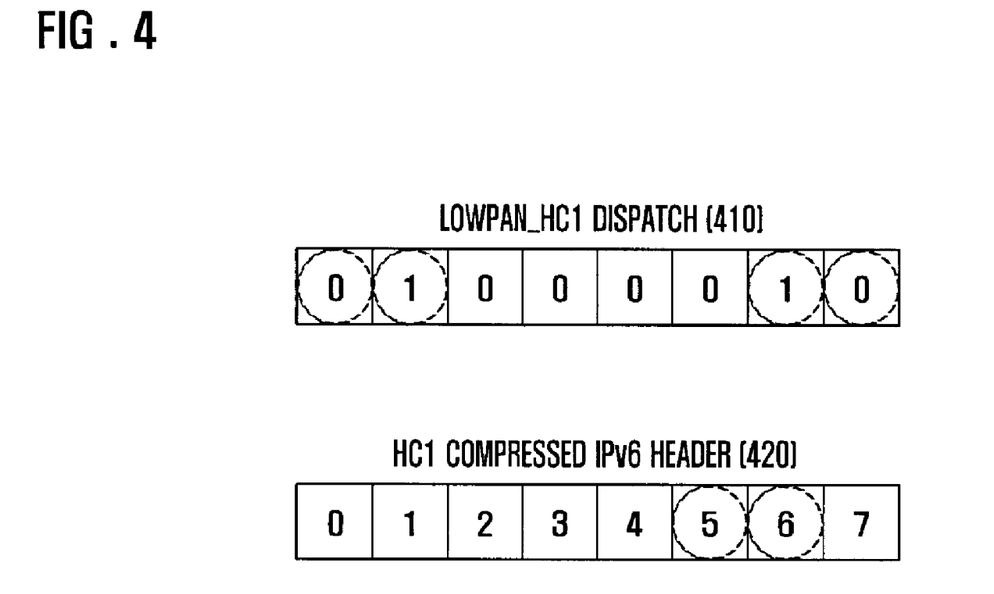
FIG. 4 is a diagram illustrating a format of an HC1 (compressed IPv6) header following a LoWPAN_HC1 Dispatch header according to an exemplary embodiment of the present invention.

FIG. 4 is a diagram illustrating a format of an HC1 (compressed IPv6) header following a LoWPAN_HC1 Dispatch header according to an exemplary embodiment of the present invention.

Referring to FIG. 4, the LoWPAN_HC1 Dispatch header 410 has a bit pattern 01 000010 which indicates that the dispatch header is followed by an HC1 header 420. The HC1 (compressed IPv6) header 420 includes $0^{th}$ to $7^{th}$ bits. Table 4 herein below shows the indication of each bit of the HC1 header 420.

TABLE 4

| Bit order | Meaning |
| --- | --- |
| 0 | Source prefix compressed |
| 1 | Source interface identifier compressed |
| 2 | Destination prefix compressed |
| 3 | Destination interface identifier compressed |
| 4 | Traffic Class and Flow Label zero |
| 5, 6 | Next Header<br>00: uncompressed, 01: UDP, 10: TCP, 11: ICMP |
| 7 | Additional HC2 compression header follows |

As shown in Table 4, the $0^{th}$ bit indicates whether the source prefix is compressed; the $1^{st}$ bit indicates whether the source interface identifier is compressed; the $2^{nd}$ bit indicates whether the destination prefix compressed; the $3^{rd}$ bit indicates whether the destination interface identifier is compressed; the $4^{th}$ bit indicates whether the Traffic Class and Flow Label are zeros; the $5^{th}$ and $6^{th}$ bits indicate next header information (i.e. '00' indicates uncompressed header, '01' indicates UDP header, '10' indicates TCP header, and '11' indicates ICMPv6 header); and the $7^{th}$ header indicates whether an additional compressed HC2 header, such as compressed UDP header, follows.

Figure 5:
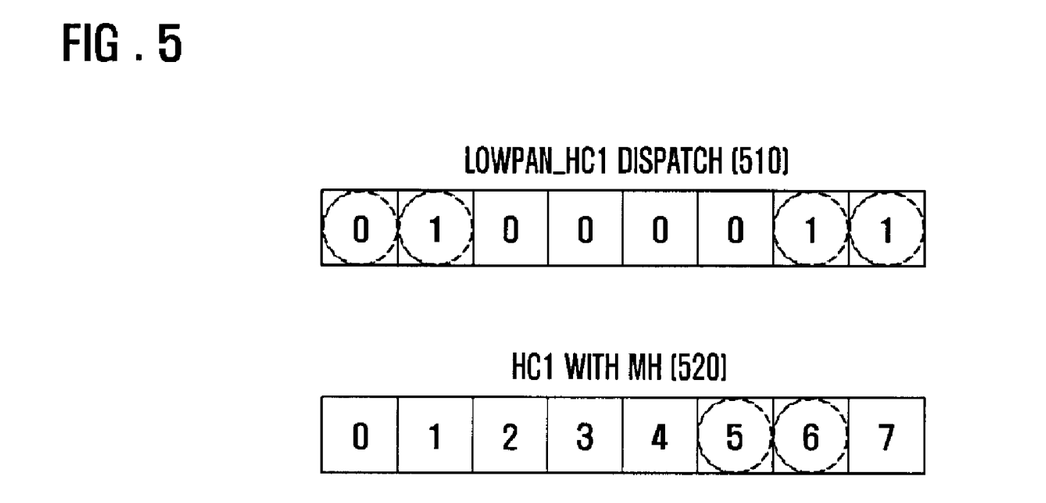
FIG. 5 is a diagram illustrating a format of a Mobility header (HC1 with MH) following a LoWPAN_HC1 Dispatch header according to an exemplary embodiment of the present invention.

FIG. 5 is a diagram illustrating a format of a Mobility header (HC1 with MH) following a LoWPAN_HC1 Dispatch header according to an exemplary embodiment of the present invention.

Referring now to FIG. 5, the LoWPAN_HC1 Dispatch header 510 has a bit pattern 01 000011 which indicates that an HC1_with_MH header 520 follows. The HC1_with_MH header 520 consists of $0^{th}$ to $7^{th}$ bits like the HC1 header 420 of FIG. 4. Table 5 herein below shows the indication of each bit of the HC1_with_MH header 520.

TABLE 5

| Bit order | Meaning |
| --- | --- |
| 0 | Source prefix compressed |
| 1 | Source interface identifier compressed |
| 2 | Destination prefix compressed |
| 3 | Destination interface identifier compressed |
| 4 | Traffic Class and Flow Label zero |
| 5, 6 | Next Header<br>00: Mobility Header; 01, 10, 11: reserved |
| 7 | Additional HC2 compression header follows |

As shown in Table 5, the $0^{th}$ bit indicates whether the source prefix is compressed; the $1^{st}$ bit indicates whether the source interface identifier is compressed; the $2^{nd}$ bit indicates whether the destination prefix compressed; the $3^{rd}$ bit indicates whether the destination interface identifier is compressed; the $4^{th}$ bit indicates whether the Traffic Class and Flow Label are zeros; the $5^{th}$ and $6^{th}$ bits indicate next header information; and the $7^{th}$ header indicates whether an additional compressed HC2 header, such as compressed UDP header, follows. When the LoWPAN_HC1 Dispatch header is set for the HC1_with_MH header, the $5^{th}$ and $6^{th}$ bits of Mobility header are interpreted differently. In the case that the HC1_with_MH header is included in the Dispatch header, the HC1_with_MH header's $5^{th}$ and $6^{th}$ bits set to 00 indicate that the next header is a mobility header. In this case, 01, 10, and 11 are reserved for other extension headers. As aforementioned, the $5^{th}$ and $6^{th}$ bits of the HC1 header are differently interpreted according to the bit pattern of the Dispatch header. In this manner, the 40-byte IPv6 header can be compressed into 2 bytes. Furthermore, the 2-byte compressed IPv6 header is configured to support mobility. Accordingly, the mobility header compression method and system according to this exemplary embodiment enables supporting mobility with the IPv6 to a LoWPAN using small transmission unit.

In order to support mobility of 6LoWPAN in unit of network or node, a binding procedure is preferably performed between a mobile node (or mobile router) with a correspondent node, preferably a Home Agent (HA). The mobile node and HA exchange signaling messages such as Binding Update (BU) message and Binding Acknowledgement (BA) message. The mobile node can be, for example, a Host or Router supporting IPv6 and mobility. In order to simplify the explanation, the term "mobile node" is used for indicating a node having routing functions and interchangeably with "mobile router." A mobile node obtains an IPv6 address from its home network, i.e. home address (HOA) and, when it is away from the home network, a Care-of Address (CoA). The HA is a router on the mobile node's home network and maintains binding between the HoA and CoA. When the mobile node moves away from the home network to a foreign network, the HA fords the packets destined to the HoA to the current location of the mobile node, i.e. CoA. In order to secure a seamless service, the mobile node and HA exchange binding messages containing HoA and CoA information, i.e. the mobile node sends a binding update message to the HA and the HA sends a binding acknowledgement message to the mobile node. The mobility header compression method according to this embodiment also compress the binding headers, i.e. a binding update header containing binding update information and a binding acknowledgement header containing binding acknowledgement information. The binding update or binding acknowledgement information and compression information are contained in the mobility header (MH). Now, the structure of the MH which follows the Dispatch header of which bit pattern is 01 00001 and, particularly, the $5^{th}$ and $6^{th}$ bits are set to '00,' is described in detail herein below.

Figure 6:
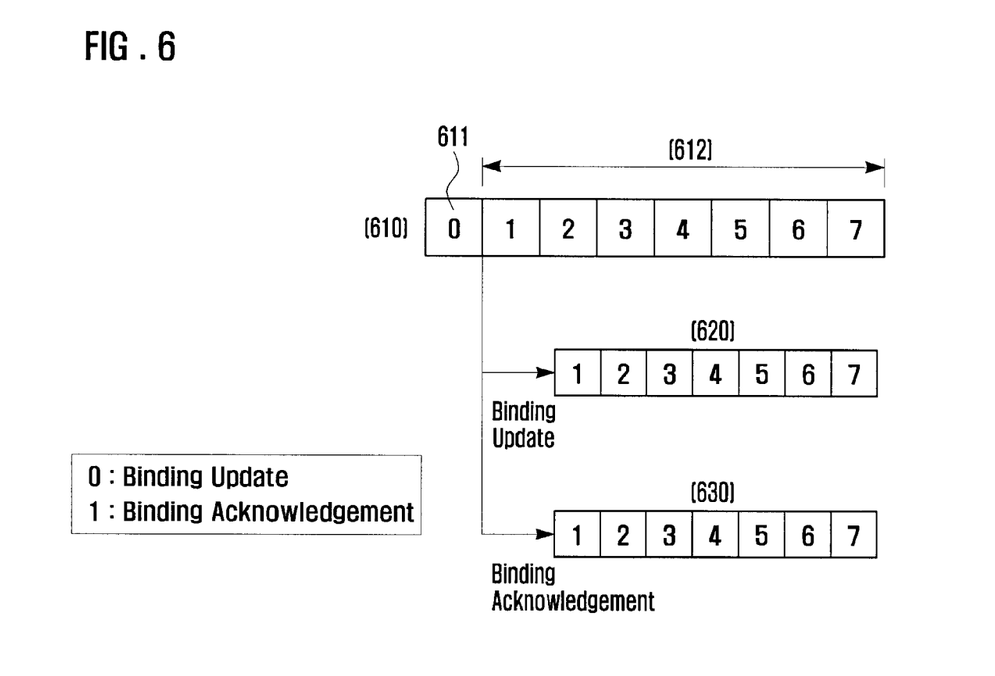
FIG. 6 is a diagram illustrating a format of a mobility header (MH) according to an exemplary embodiment of the present invention.

FIG. 6 is a diagram illustrating a format of a mobility header (MH) according to an exemplary embodiment of the present invention.

Referring to FIG. 6, an MH 610 as an extension header following the HC1_with_MH header 520 (see FIG. 5) consists of 8 bits (1 byte) including a most significant bit 611 ($0^{th}$ bit). The $0^{th}$ bit 611 of the MH 610 indicates whether the rest 7-bit sequence 612 is binding update information or binding acknowledgement information. The $0^{th}$ bit 611 set to 0 indicates that the 7-bit sequence 612 is the binding update information 620, and the $0^{th}$ bit set to 1 indicates that the 7-bit sequence 612 is the binding acknowledgement information.

Table 6 shows information indicated by the respective bits of the 7-bit sequence, when the $0^{th}$ bit is set to 0.

TABLE 6

| Bit order | Meaning |
| --- | --- |
| 1 | Compressed Sequence Number |
| 2 | Compressed Lifetime |
| 3 | Acknowledgement bit |
| 4 | Home Registration bit |
| 5 | Mobile Network Prefix bit |
| 6 | Home Address |
| 7 | Reserved |

As shown in the example in FIG. 6, the $1^{st}$ bit indicates whether a Sequence Number is compressed. If the $1^{st}$ bit is set, then the 16-bit sequence number of the binding update packet is compressed to 8 bits. The $2^{nd}$ bit indicates whether lifetime information is compressed. If the $2^{nd}$ bit is set, then the life time field of the binding update packet is compressed from 16 bits to 8 bits. The $3^{rd}$ bit indicates whether to receive an acknowledgement packet from the recipient, i.e. the HA. The $4^{th}$ bit indicates whether to request a home registration. If the $4^{th}$ bit is set, then home registration is performed. The $5^{th}$ bit indicates whether network mobility information is contained. If the $5^{th}$ bit is set, then the network prefix information is carried. The $6^{th}$ bit indicates whether the home address information of the mobile node is contained. The $7^{th}$ bit is reserved for other purpose.

Table 7 herein below shows information indicated by the respective bits of the 7-bit sequence, when the $0^{th}$ bit is set to 1.

TABLE 7

| Bit order | Meaning |
| --- | --- |
| 1 | Compressed Sequence Number |
| 2 | Compressed Lifetime |
| 3-7 | Status |

As shown in table 7, the $1^{st}$ bit indicates whether the Sequence Number is compressed. If the $1^{st}$ bit is set, the sequence number of a 16-bit binding acknowledgement packet is compressed to 8 bits. The $2^{nd}$ bit indicates whether lifetime information is compressed. If the $2^{nd}$ bit is set, then the life time field of the binding acknowledgement packet is compressed from 16 bits to 8 bits. The $3^{rd}$ to $7^{th}$ bits are set to values for indicating 18 statuses of the binding acknowledgement packet.

Figure 7A:
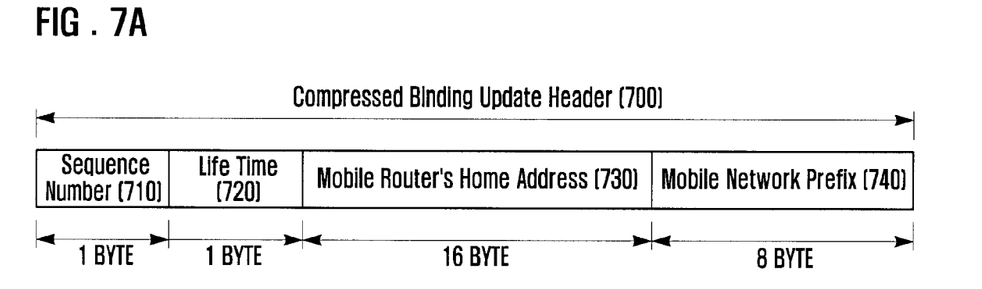
FIG. 7A is a diagram illustrating a format of a binding update header following the mobility header of FIG. 6.
Figure 7B:
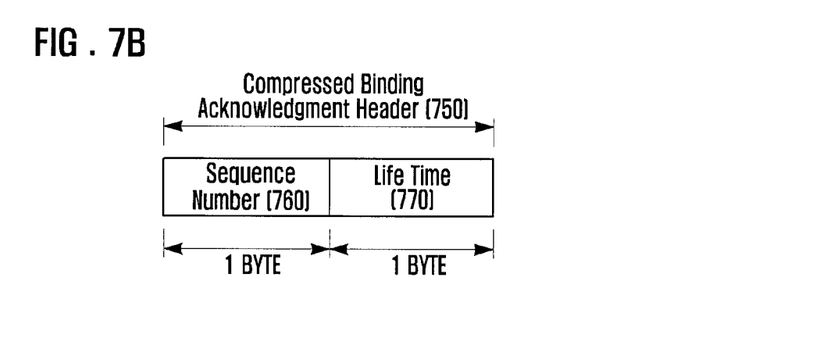
FIG. 7B is a diagram illustrating a format of a binding acknowledgement header following the mobility header of FIG. 6.

The binding update header and binding acknowledgement header indicated by the information included in the MH is formatted as shown in FIGS. 7a and 7b.

FIGS. 7a and 7b are diagrams illustrating formats of a binding update header and a binding acknowledgement header, respectively, following a Mobility header (MH) according to an exemplary embodiment of the present invention.

In FIG. 7a, a binding update header 700 includes a 1-byte sequence number field 710, a 1-byte lifetime field 720, a 16-byte mobile router's home address field 730, and an 8-byte mobile network prefix field 740. In this embodiment, a 36 byte binding update header transmitted from the mobile node to the HA is compressed to 26 bytes, thereby reducing the transmission packet size. In FIG. 7b, a binding acknowledgement header 750 includes a 1-byte sequence number field 760 and a 1-byte lifetime field. By omitting the fields except for the sequence number of lifetime fields, an original 12-byte binding acknowledgement header can be compressed to 2 bytes. Accordingly, the mobility header compression method and system according to this embodiment allows adopting IPv6 to the 6LoWPAN and further supports mobility to the 6LoWPAN, overcoming 6LoWPAN's limited packet size. How to create the above-structured 6LoWPAN packet headers is described hereinafter in more detail.

Figure 8:
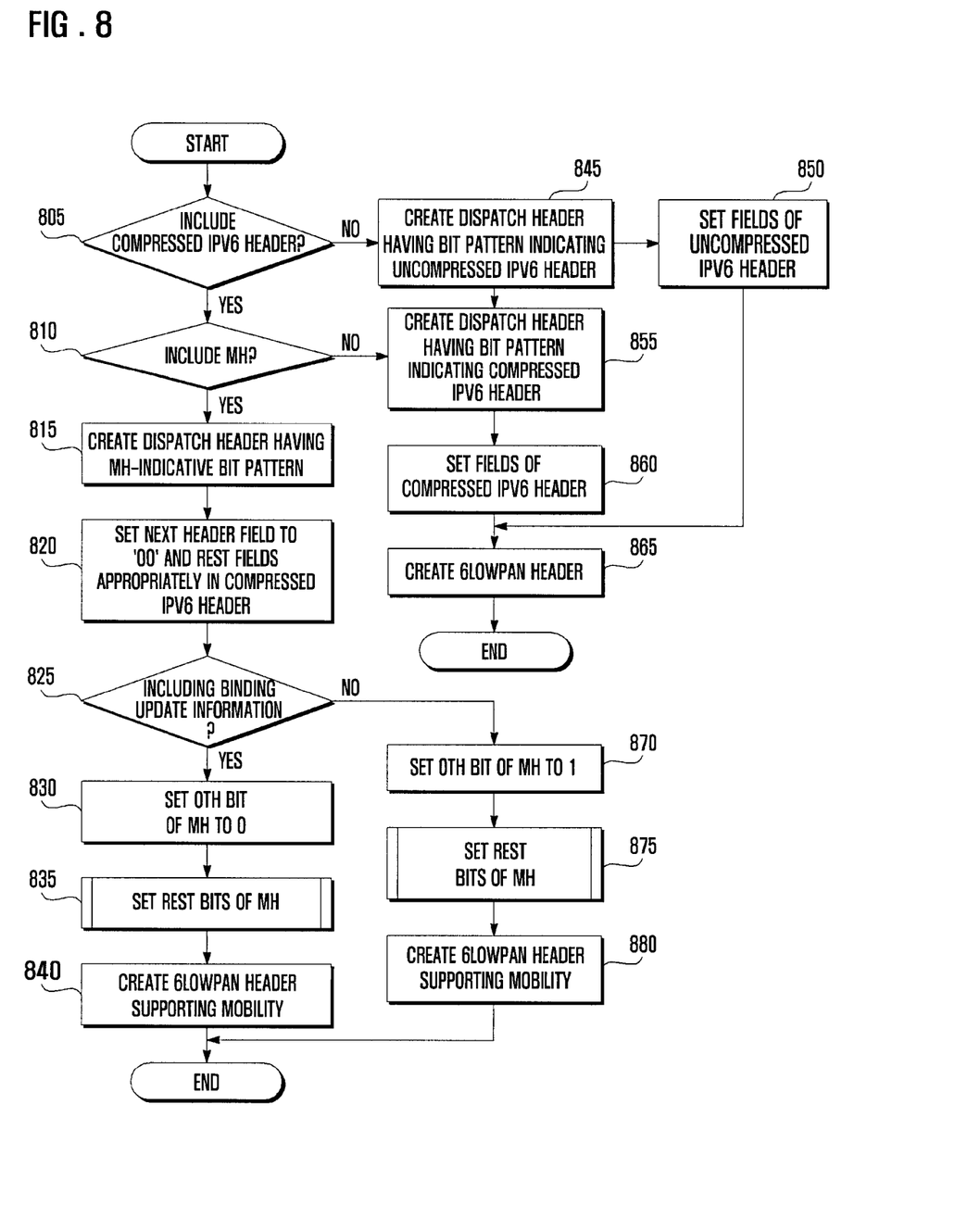
FIG. 8 is a flowchart illustrating a mobility header compression method according to an exemplary embodiment of the present invention.

FIG. 8 is a flowchart illustrating a mobility header compression method according to an exemplary embodiment of the present invention. In this exemplary embodiment, a Dispatch header creation procedure is described with an exemplary case in which the Dispatch header including IPv6 addresses. In the following description, the transmission node can be a mobile node, a mobile router, or an HA that are transmitting binding messages including binding update messages and binding acknowledgement messages.

Referring to FIG. 8, a transmission node (mobile node or HA) determines whether the packet to be transmitted includes a compressed IPv6 (HC1) header (S805). If the packet includes a compressed IPv6 header, then the transmission node performs step S810 and, otherwise, performs step S845. At step S810, the transmission node determines whether the IPv6 header includes an MH. If the IPv6 header includes an MH, the transmission node performs step S815 and, otherwise, performs step S855. At step SS815, the transmission node creates a Dispatch header having a MH-indicative bit pattern. In this embodiment, the MH indicative bit pattern is '01000011' shown in FIG. 3C. After creating the Dispatch header, the transmission node sets the $5^{th}$ and $6^{th}$ bits (Next header field) of the IPv6 header to '00,' which indicates that the MH follows the IPv6 header, and the rest bits appropriately. Next, the transmission node determines whether or not the packet is a binding update packet carrying the binding update information (S825). If the packet is a binding update packet, the transmission node performs step S830 or, otherwise, performs step S870. At step S830, the transmission node sets the $0^{th}$ bit of the MH to '0' indicating the binding update information. Although '0' is configured as a value indicating the binding update information in this exemplary embodiment, the binding update information-indicative bit can be configured to '1.' Next, the transmission node sets the rest bits of the MH appropriately (S835). The binding update header's bit pattern setting procedure is described later with reference to FIGS. 9A and 9B. After setting all the bits of the MH, the transmission node creates a mobility supportive 6LoWPAN header including the Dispatch header, compressed IPv6 header (HC1 with MH), and MH set as described above (S840).

Meanwhile, if the packet is not a binding update packet at step S825, then the transmission node sets the $0^{th}$ bit of the MH to '1' indicating the binding acknowledgement information (S870). Although '1' is configured as a value indicating the binding acknowledgement information in this embodiment, the binding acknowledgement information-indicative bit can be configure to '0.' Next, the transmission node sets the rest bits of the MH appropriately (S875). The binding acknowledgement header's bit pattern setting procedure is described later with reference to FIG. 10. After setting all the bits of the MH, the transmission node creates a mobility supportive 6LoWPAN header including the Dispatch header, compressed IPv6 header (HC1 with MH), and MH set as described above (S880).

At step S845, the transmission node creates a Dispatch header having a bit pattern indicating that the Dispatch header is followed by an uncompressed IPv6 header. In this embodiment, the non-MH uncompressed IPv6 header-indicative bit pattern is '01000001' shown in FIG. 3a. After creating the Dispatch header, the transmission node sets the IPv6 header having uncompressed header fields (S850) and then performs step S865.

In a case that the compressed IPv6 header which is not followed by MH is included, the transmission node sets creates a Dispatch header having a bit pattern indicating that a compressed IPv6 follows the Dispatch header (S860). In this embodiment, the non-MH compressed IPv6-indicative bit pattern is '01000010' shown in FIG. 3b. Next, the transmission node sets the fields of compressed IPv6 header (HC1) (S860). After creating the compressed or uncompressed IPv6 header, the mobile node creates a 6LoWPAN header including the Dispatch header and compressed or uncompressed IPv6 header (S865).

Figure 9A:
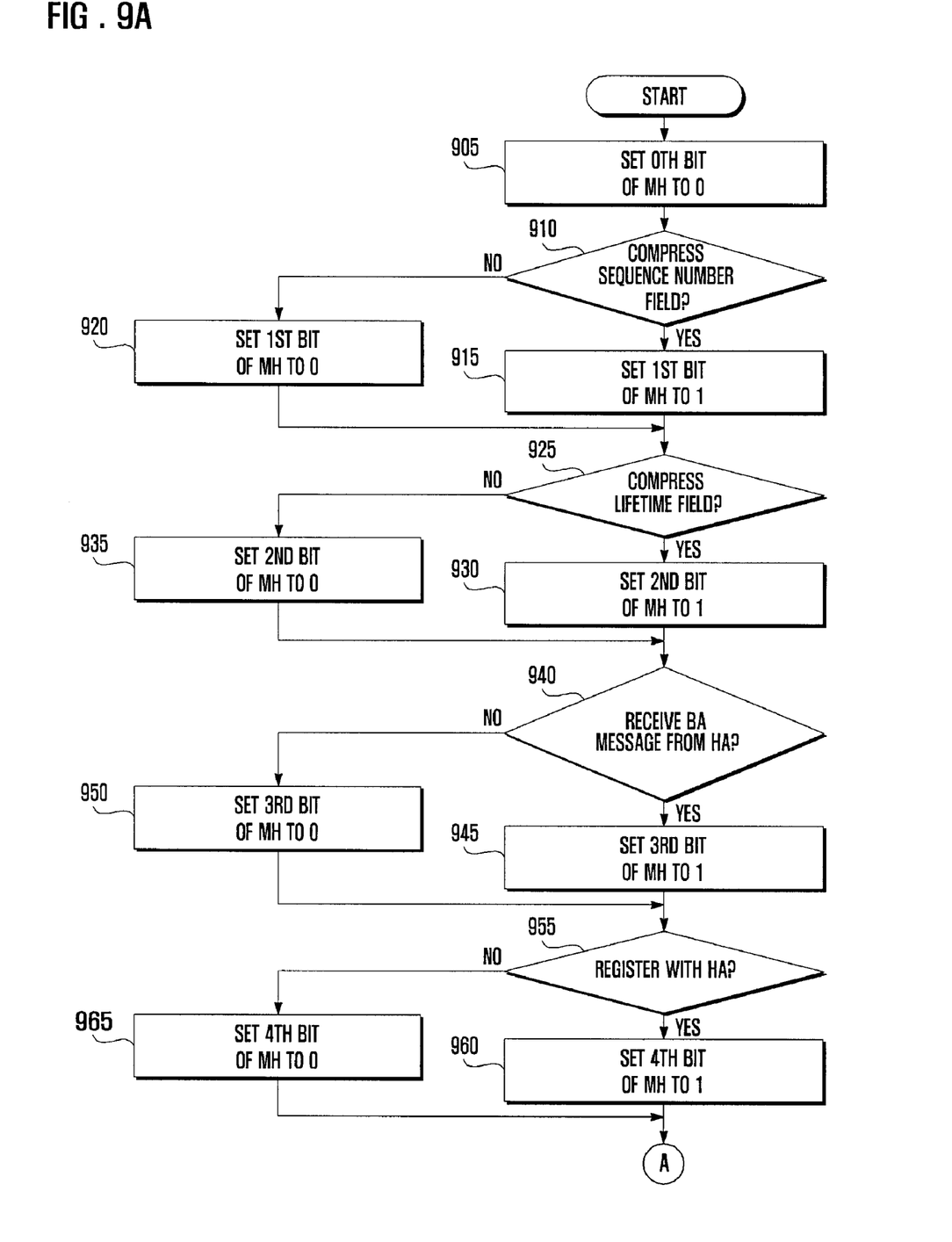
FIGS. 9A and 9B are a flowchart illustrating a binding update header-indicative mobility header creation procedure of the mobility header compression method of FIG. 8.
Figure 9B:
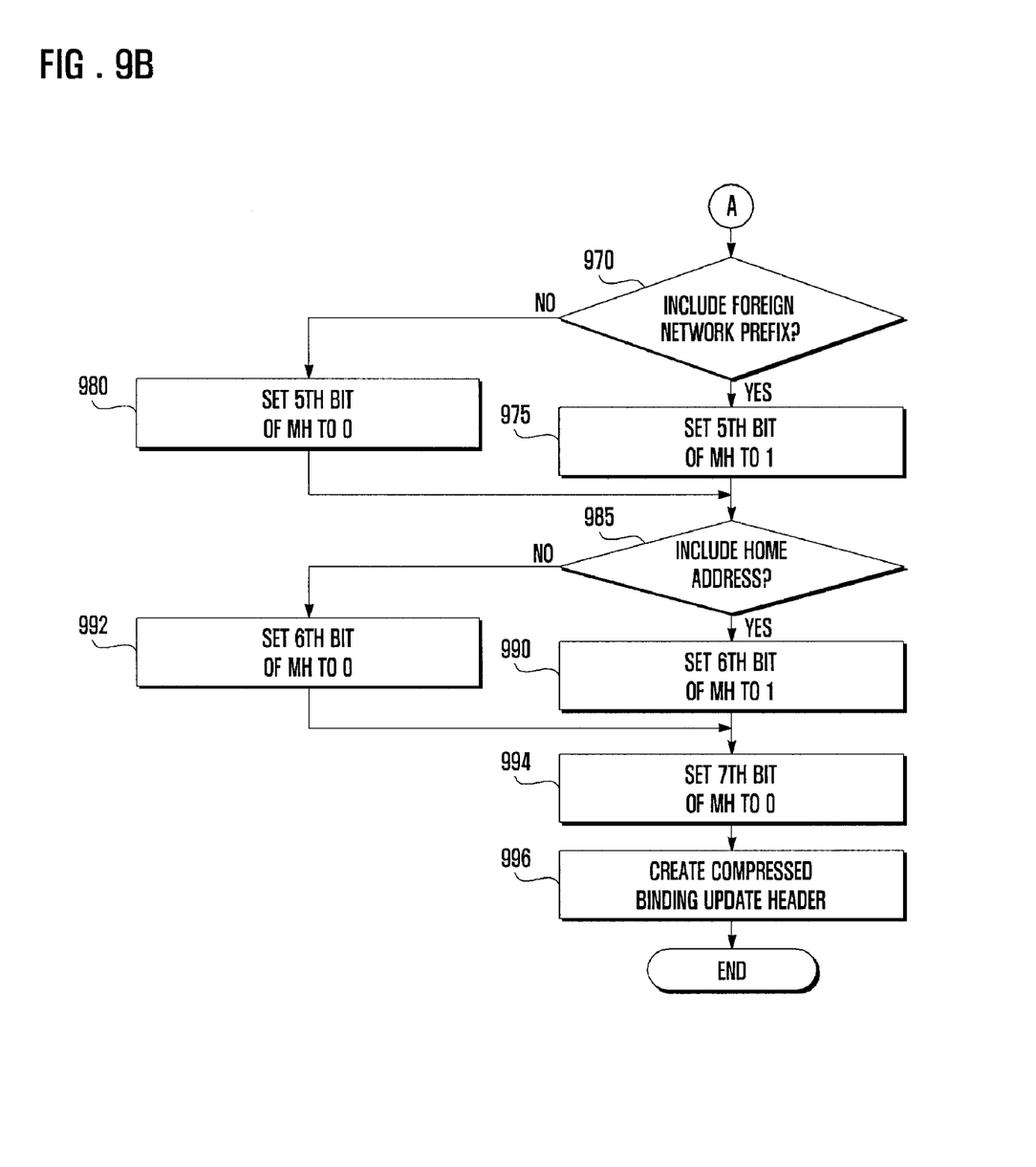

FIGS. 9A and 9B are a flowchart illustrating a binding update header-indicative mobility header creation procedure of the mobility header compression method of FIG. 8.

Referring to FIGS. 9A and 9B, when it is determined that the packet is a binding update packet at step S825 in FIG. 8, the transmission node sets the $0^{th}$ bit of the MH to '0' (S905) and determines whether the sequence number of the binding update header can be compressed (S910). If the sequence number can be compressed, then the transmission node sets the $1^{st}$ bit of the MH to '1' (S915) and, otherwise, sets the $1^{st}$ bit of the MH to '0' (S920). After setting the sequence number compression indicative bit, the transmission node determines whether the lifetime field of the binding update header can be compressed (S925). If the lifetime filed can be compressed, then the transmission node sets the $2^{nd}$ bit of the MH to '1' (S930) and, otherwise, sets the $2^{nd}$ bit of the MH to '0' (S935). After setting the lifetime compression indicative bit, the transmission node determines whether a binding acknowledgement is required (S940). If a binding acknowledgement is required, then the transmission node sets the $3^{rd}$ bit of the MH to '1' (S945) and, otherwise, sets the $3^{rd}$ bit of the MH to '0' (S950). After setting the binding acknowledgement indicative bit, the transmission node determines whether a home registration is required (S955). If a home registration is required, then the transmission node sets the $4^{th}$ bit of the MH to '1' (S960) and, otherwise, sets the $4^{th}$ bit of the MH to '0' (S965). After setting the home registration indicative bit, the transmission node determines whether a foreign network prefix is included (S970). If a foreign network prefix is included, then the transmission node sets the $5^{th}$ bit of the MH to '1' (S975) and, otherwise, sets the $5^{th}$ bit of the MH to '0' (S980). After setting the foreign network prefix indicative bit, the transmission node determines whether a home address is included (S985). If the home address is included, then the transmission node sets the $6^{th}$ bit of the MH to '1' (S990) and, otherwise, sets the $6^{th}$ bit of the MH to '0' (S992). After setting the home address indicative bit, the transmission node sets the $7^{th}$ bit of the MH to '0' (S994). As aforementioned above, the $7^{th}$ bit is reserved for other purpose in future. Finally, the transmission node creates a compressed binding update header (S996). How to create a compressed binding update header with the header information created as described above is described with reference to FIG. 11 later.

Figure 10:
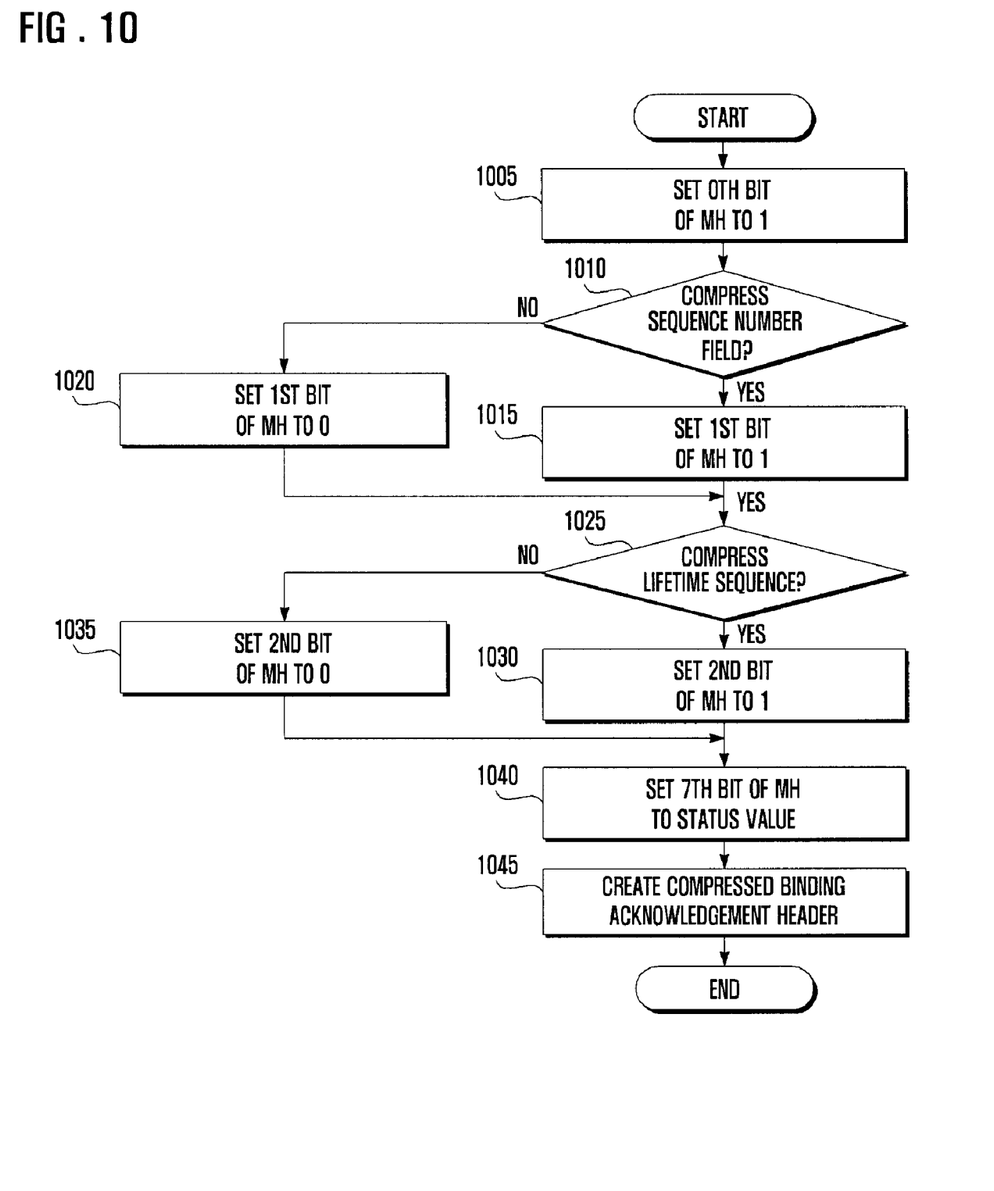
FIG. 10 is a flowchart illustrating a binding acknowledgement header-indicative mobility header creation procedure of the mobility header compression method of FIG. 8.

FIG. 10 is a flowchart illustrating a binding acknowledgement header-indicative mobility header creation procedure of the mobility header compression method of FIG. 8.

Referring to FIG. 10, when it is determined that the packet is a binding acknowledgement packet at step S825 in FIG. 8, a transmission node sets the $0^{th}$ bit of the MH to '1' (S1005) and determines whether the sequence number field of the binding update header can be compressed (S1010). If the sequence number can be compressed, then the transmission node sets the $1^{st}$ bit of the MH to '1' (S1015) and, otherwise, sets the $1^{st}$ bit of the MH to '0' (S1020). After setting the sequence number compression indicative bit, the transmission node determines whether a lifetime field can be compressed (S1025). If the lifetime field can be compressed, then the transmission node sets the $2^{nd}$ bit of the MH to '1' (S1030) and, otherwise, sets the $2^{nd}$ bit of the MH to '0' (S1035). After setting the lifetime field compression indicative bit, the transmission node sets the $3^{rd}$ to $7^{th}$ bits of the MH to a predetermined status values (S1040) and finally creates a compressed binding acknowledgement header (S1045). How to create a compressed binding acknowledgement header with the header information created as described above is described with reference to FIG. 12.

Figure 11:
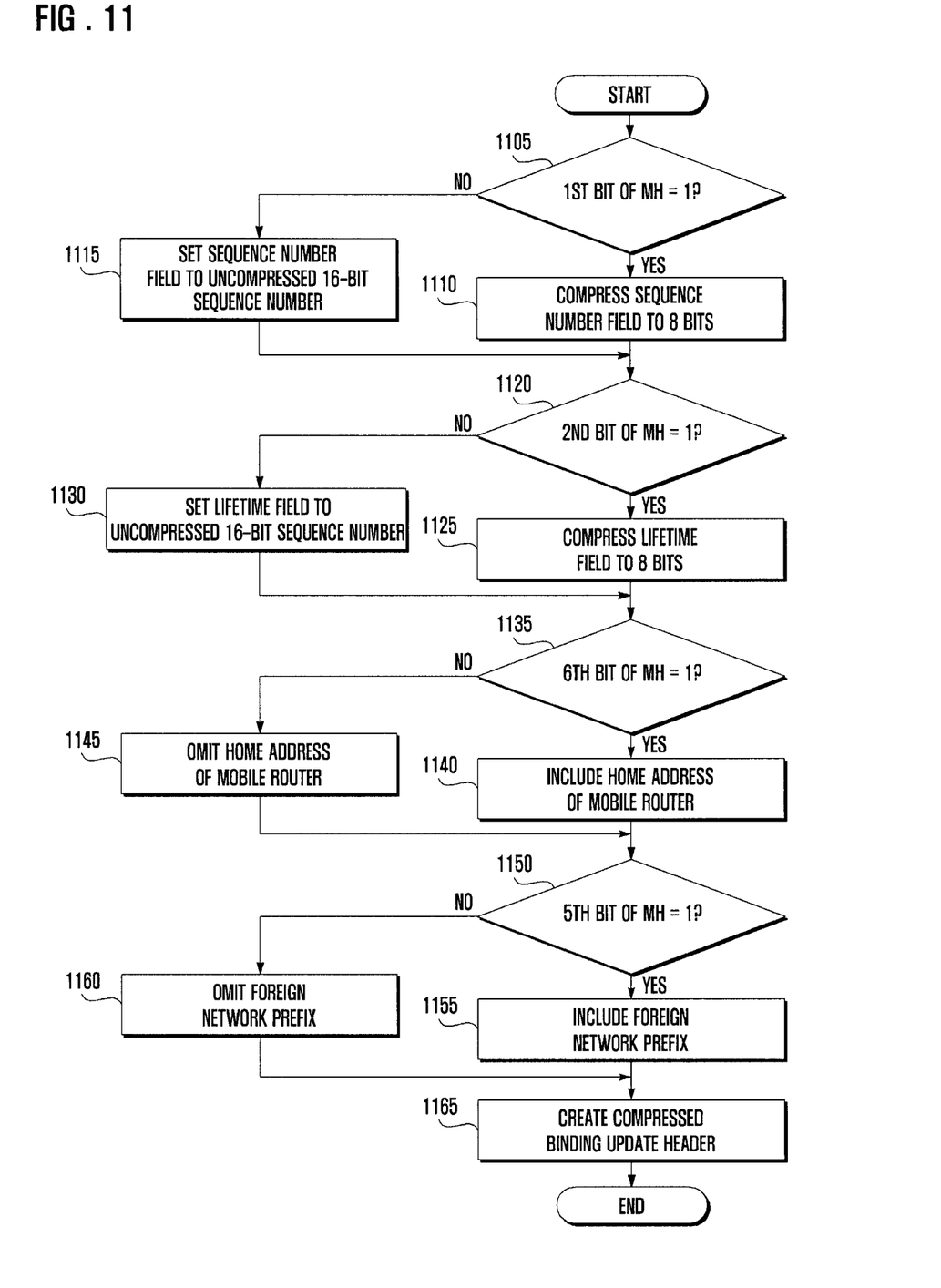
FIG. 11 is a flowchart illustrating a compressed binding update header creation procedure of the mobility header compression method of FIG. 8.

FIG. 11 is a flowchart illustrating a compressed binding update header creation procedure of the mobility header compression method of FIG. 8.

Referring to FIG. 1, the transmission node determines whether the $1^{st}$ bit of the MH (see FIG. 6) is set to '1' (S1105). If the $1^{st}$ bit of the MH is set to '1,' then the transmission node sets the sequence number field of a binding update header to a 8-bit compressed sequence number (S1110) and, otherwise sets the sequence number field to a 16-bit uncompressed sequence number (S1115). After setting the sequence number field, the transmission node determines whether the $2^{nd}$ bit of the MH is set to '1' (S1120). If the $2^{nd}$ bit of the MH is set to '1,' then the transmission node sets the lifetime field of the binding update header to an 8-bit compressed lifetime (S1125) and, otherwise, sets the lifetime field to a 16-bit uncompressed lifetime (S1130). After setting the lifetime field, the transmission node determines whether the $6^{th}$ bit of the MH is set to '1' (S1135). If the $6^{th}$ bit of the MH is set to '1,' then the transmission node sets its home address in the binding update header (S1140) or, otherwise, skips setting the home address (S1145). Next, the transmission node determines whether the $5^{th}$ bit of the MH is set to '1' (S1150). If the $5^{th}$ bit of the MH is set to '1,' then the transmission node its foreign network prefix address in the binding update header (S1155) and, otherwise, skips setting the foreign network prefix address (S1160). Finally, the transmission node creates the binding update header with the field values set through steps S1105 to S1155 (S1165). The binding update header created in this manner is formatted as shown in FIG. 7a.

Figure 12:
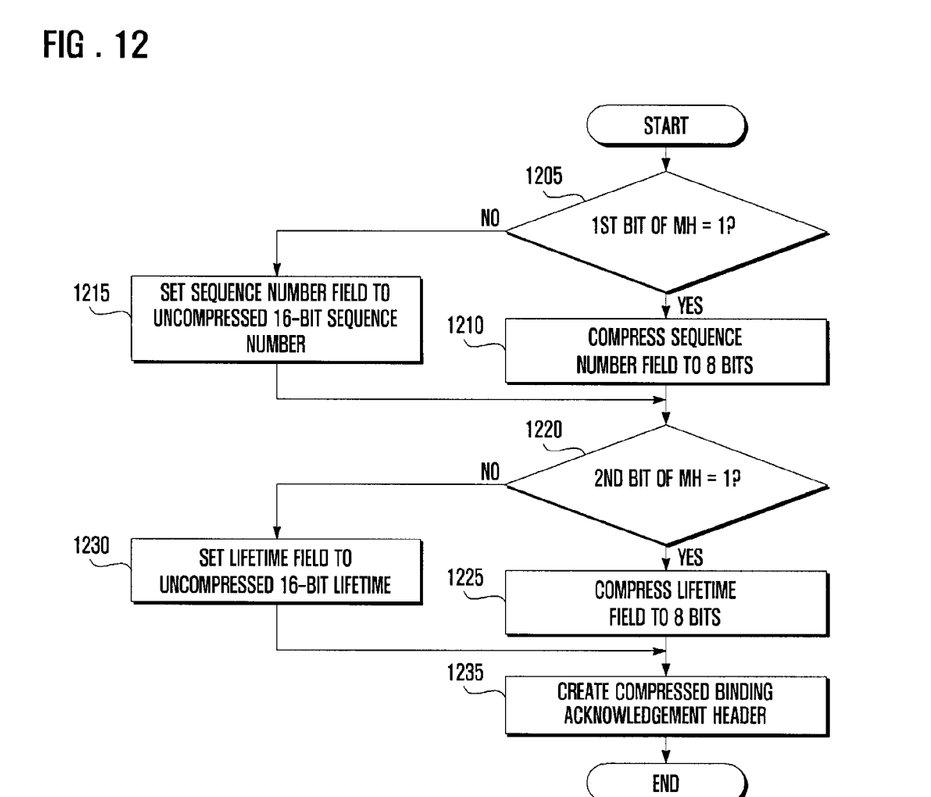
FIG. 12 is a flowchart illustrating a compressed binding acknowledgement header creation procedure of the mobility header compression method of FIG. 8.

FIG. 12 is a flowchart illustrating a compressed binding acknowledgement header creation procedure of the mobility header compression method of FIG. 8.

Referring to FIG. 12, the transmission node first determines whether the $1^{st}$ bit of the MH (see FIG. 6) is set to '1' (S1205). If the $1^{st}$ bit of the MH is set to '1,' then the transmission node sets the sequence number field of a binding acknowledgement header to an 8-bit compressed sequence number (S1210) and, otherwise, sets the sequence number field to a 16-bit uncompressed sequence number (S1215). Next, the transmission node determines the $2^{nd}$ bit of the MH is set to '1' (S1220). If the $2^{nd}$ bit of the MH is set to '1,' then the transmission node sets the lifetime field of binding acknowledgement header to an 8-bit compressed lifetime (S1225) and, otherwise, sets the lifetime field to a 16-bit uncompressed lifetime (S1230). Finally, the transmission node creates the binding acknowledgement header with the field values set through steps S1250 to 1225 (S1235). The binding acknowledgement header created in this manner is formatted as shown in FIG. 7B.

Figure 13:
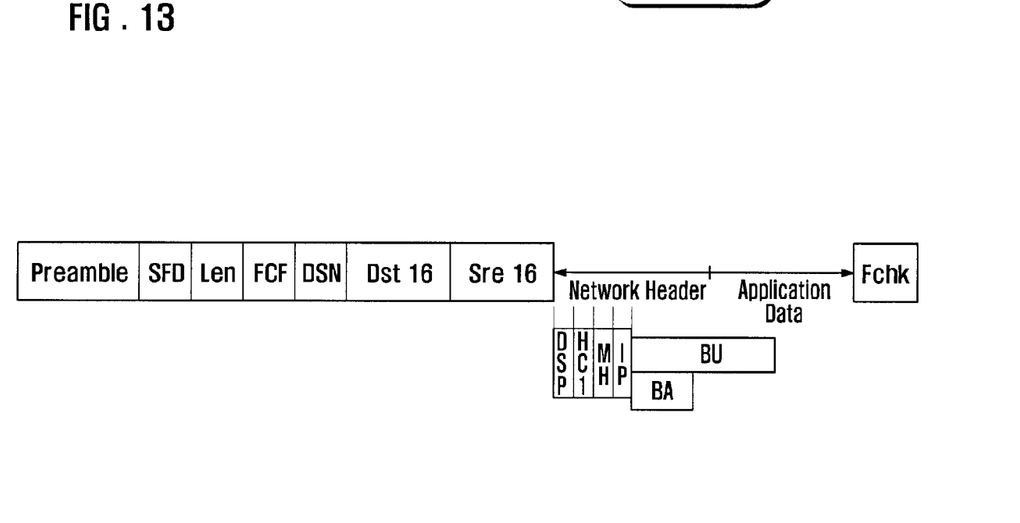
FIG. 13 is a diagram illustrating a format of a packet having a packet header created by the mobility header compression method of FIG. 8.

FIG. 13 is a diagram illustrating a format of a packet having a packet header created by the mobility header compression method of FIG. 8.

As previously discussed, the MAC PDU of the LoWPAN is limited to 127 bytes. In FIG. 13, the packet can be created with the length of 127 bytes except for the preamble, which is a physical layer header, and the Start-of-Frame Delimiter (SFD). Also, the MAC PDU can carry up to 81 bytes of payload including a network layer protocol header and application data. The MAC header includes a Length (Len), a Frame Check Field (FCD), a Data Sequence Number (DSN), a Destination address (DST), a Source Address (SRC), and A Frame Checksum (Fchk).

According to the mobility header compression method, the adaptation layer interposed between the LoWPAN MAC layer and Network layer minimizes the adaptation overhead up to at most 30 bytes including a 1 byte Dispatch header (DSP), a 1 byte compressed IPv6 header (HC1), a 1 byte mobility header (MH), a 1 byte conventionally compressed IPv6 header (IP), and a compressed binding update (BU) header having a length up to 26 bytes or a compressed binding acknowledge (BA) header having a length up to 2 bytes. Accordingly, the mobility header compression method can support mobility to the LoWPAN without compromising transmission efficiency of IPv6 packets in the LoWPAN environment.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A header compression method for a wireless network, comprising:
    (a) determining whether a second header contains a compressed Internet Protocol version 6 (IPv6) information in a packet comprising data and at least one header containing transmission information about the data including the second header;
    (b) determining, when the second header contains a compressed IPv6 information, whether a mobility header follows the second header;
    (c) setting, when the second header is followed by the mobility header, a mobility support-indicative field of a first header containing information about the second header to indicate that the first header is followed by a compressed IPv6 header with the mobility header and a mobility header-indicative field of the second header to indicate that the second header is followed by the mobility header;
    (d) compressing a remainder of fields of the second header except for the mobility header-indicative field;
    (e) setting a mobility information-indicative field of the mobility header to indicate inclusion of mobility information; and
    (f) compressing a remainder of fields of the mobility header except for the mobility information-indicative field.

2. The header compression method of claim 1, wherein the first header comprises a Dispatch header having a length of 8 bits and being included in an IP version 6 based Lower Power Wireless Personal Area Network (6LoWPAN) packet.

3. The header compression method of claim 2, wherein the first header in (c) is set to a predetermined bit pattern for indicating that the first header is followed by a compressed IPv6 header and mobility header.

4. The header compression method of claim 2, wherein the first header is set to a different predetermined bit pattern for indicating whether the first header is followed by a compressed IPv6 header or not, and whether the second header is followed by a mobility header or not.

5. The header compression method of claim 4, wherein the second header comprises a next header field which is set, when the first header is set to a predetermined bit pattern indicating that the second header is followed by an uncompressed next header, a user datagram protocol (UDP) header, an Internet control message protocol (ICMP) header, and a transmission control protocol (TCP) header.

6. The header compression method of claim 1, wherein the second header comprises a compressed IPv6 header having a length of 8 bits.

7. The header compression method of claim 6, wherein the mobility header-indicative field comprises a Next header field having a length of 2 bits.

8. The header compression method of claim 7, wherein compressing said remainder of the fields of the second header comprises:
    (i) assigning one bit out of 6 bits, except for the mobility header-indicative field, for indicating whether a source prefix is compressed;
    (ii) assigning a second bit out of the 6 bits for indicating whether a source interface identifier is compressed;
    (iii) assigning a third bit out of the 6 bits for indicating whether a destination prefix is compressed;
    (iv) assigning a fourth bit out of the 6 bits for indicating whether a destination interface identifier is compressed;
    (v) assigning a fifth bit out of the 6 bits for indicating whether traffic class and flow label are compressed; and
    (vi) assigning a sixth bit out of the six bits for indicating whether the second header is followed by an additional compressed header.

9. The header compression method of claim 1, wherein the mobility header comprises 8 bits.

10. The header compression method of claim 9, wherein the mobility information-indicative field of the mobility header comprises one bit of the 8 bits, and the one bit is set to a predetermined bit pattern for indicating that the mobility header is followed by mobility information.

11. The header compression method of claim 10, wherein the mobility information comprises a binding update information.

12. The header compression method of claim 11, wherein the binding update information comprises a sequence number, a lifetime, an acknowledgement request, a home registration, a foreign network prefix, and a home address.

13. The header compression method of claim 12, wherein compressing the remainder of fields of the mobility header comprises:
    (i) assigning a first bit of the 8 bits, except for the $0^{th}$ bit of the 8 bits, for indicating whether the sequence number is compressed;
    (ii) assigning a second bit of the 8 bits for indicating whether the lifetime is compressed;
    (iii) assigning a third bit of the 8 bits for indicating whether the acknowledgement request is enabled;
    (iv) assigning a fourth bit of the 8 bits for indicating whether the home registration is enabled;
    (v) assigning a fifth bit of the 8 bits for indicating whether a foreign network prefix is included;
    (vi) assigning a sixth bit of the 8 bits for indicating whether a home address is included; and
    (vii) reserving a seventh bit of the 8 bits for future use.

14. The header compression method of claim 13, wherein the binding update information comprises:

a sequence number field containing 1-byte sequence number matched with the bit of the mobility header which indicates whether the sequence number is compressed;

a lifetime field containing 1-byte lifetime matched with the bit of the mobility header which indicates whether the life time is compressed;

a foreign network prefix field containing 16-byte foreign network prefix matched with the bit of the mobility header which indicates whether the foreign network prefix is included; and a home address field containing 8-byte home address matched with the bit of the mobility header which indicates whether the home address is included.

15. A header compression method for a wireless network, comprising:
(a) receiving a binding update packet comprising data and a first header and a second header containing transmission information about the data;
(b) determining whether the second header contains a compressed Internet Protocol version 6 (IPv6) information;
(c) setting, when the second header contains a compressed IPv6 information, the first header to have a mobility support-indicative field indicating that the first header is followed by a compressed IPv6 header with a mobility header, and the second header to have a mobility header-indicative field for indicating that the second header is followed by the mobility header;
(d) compressing a remainder of fields of the second header except for the mobility header-indicative field;
(e) setting the mobility header to have a mobility information-indicative field indicating the mobility header is followed by a binding acknowledgement information; and
(f) compressing a remainder of fields of the mobility header except for the mobility information-indicative field.

16. The header compression method of claim 15, wherein the first header comprises a Dispatch header being 8 bits in length.

17. The header compression method of claim 16, wherein the first header is set to a predetermined bit pattern for indicating that the first header is followed by the compressed IPv6 header and mobility header.

18. The header compression method of claim 15, wherein the second header comprises 8 bits in length.

19. The header compression method of claim 18, wherein the mobility header-indicative field comprising a next header field composed of two bits of the second header and is set to a predetermined bit pattern indicating that the second header is followed by the mobility header.

20. The header compression method of claim 15, wherein the mobility header is 8 bits long, and the mobility information-indicative field is one bit of the mobility header and set to a predetermined bit pattern for indicating that the mobility header is followed by a mobility information.

21. The header compression method of claim 20, wherein the mobility information comprises binding information carried by an acknowledgement header including a 1 byte sequence number field and 1 byte life time field.

22. The header compression method of claim 21, wherein the acknowledgement header comprises a binding acknowledgement header.

23. A header compression system for a wireless network, comprising:
a plurality of mobile nodes, each node checking a packet carrying a data and a first and a second headers containing transmission information on the data to determine whether the second header contains a compressed Internet Protocol version 6 (IPv6) information; determine when the second header contains a compressed IPv6 information, whether the second header is followed by a mobility header; sets, when the second header is followed by a mobility header, a mobility support-indicative field of the first header to indicate that the second header is followed by the mobility header; sets a mobility header-indicative field of the second header to indicate that the second header is followed by the mobility header; compresses a remainder of fields of the second header except for the mobility header-indicative field; sets a mobility information-indicative field of the mobility header to indicate inclusion of mobility information; and compresses a remainder of fields of the mobility header except for the mobility information-indicative field.

* * * * *